United States Patent
Cook et al.

(10) Patent No.: US 7,783,281 B1
(45) Date of Patent: Aug. 24, 2010

(54) METHOD AND SYSTEM FOR SECURING A MOBILE DEVICE

(75) Inventors: Fred S. Cook, Olathe, KS (US); Durga Satapathy, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 364 days.

(21) Appl. No.: 10/829,711

(22) Filed: Apr. 22, 2004

(51) Int. Cl.
*H04M 3/16* (2006.01)

(52) U.S. Cl. .................. 455/410; 455/420; 455/456.1; 455/456.4

(58) Field of Classification Search ......... 455/410–411, 455/414.1, 418–420, 466, 556.2, 404.1, 404.2, 455/412.1–2, 421, 456.4, 567, 456.1, 456.3
See application file for complete search history.

(56) References Cited

U.S. PATENT DOCUMENTS

| | | | |
|---|---|---|---|
| 5,659,595 A * | 8/1997 | Chanu et al. | 455/411 |
| 5,748,084 A | 5/1998 | Isikoff | |
| 6,556,819 B2 * | 4/2003 | Irvin | 455/410 |
| 6,782,251 B2 * | 8/2004 | Kagay, Jr. | 455/410 |
| 6,823,199 B2 * | 11/2004 | Gough | 455/567 |
| 7,054,624 B2 * | 5/2006 | Cocita | 455/419 |
| 7,099,699 B2 * | 8/2006 | Jeong | 455/565 |
| 7,103,367 B2 * | 9/2006 | Adams et al. | 455/456.2 |
| 7,181,252 B2 * | 2/2007 | Komsi, Asko | 455/567 |
| 2004/0063423 A1 * | 4/2004 | Kagay, Jr. | 455/410 |
| 2004/0110488 A1 * | 6/2004 | Komsi | 455/411 |
| 2004/0224665 A1 * | 11/2004 | Kokubo | 455/411 |
| 2005/0221799 A1 * | 10/2005 | Tervo et al. | 455/411 |
| 2005/0226468 A1 * | 10/2005 | Deshpande et al. | 455/411 |

FOREIGN PATENT DOCUMENTS

| | | | |
|---|---|---|---|
| EP | 1220556 A1 * | 7/2002 | |
| JP | 07-193865 | 7/1995 | |
| JP | 2001-309431 | 2/2001 | |
| JP | 2002369251 | * 12/2002 | |

OTHER PUBLICATIONS

Hirsh, Lou, "Mobile Devices", Wireless NewsFactor, Feb. 14, 2002. http://wirelessnewsfactor.com/perl/story/16357.html.
Cohn, Michael, "Keeping Data Safe" Internet World Magazine, Apr. 1, 2002.
"Action Utilities Data Sheet", Action Engine. www.actionengine.com.

* cited by examiner

*Primary Examiner*—Cong Van Tran (57) ABSTRACT

When the loss or theft of a mobile device is detected, script interpretation logic executes a script to disable one or more functions or the mobile device, such as personal organizer functions in the mobile device. The script may be stored locally on the mobile device, so that the mobile device detects loss or theft and then executes the local disabling script. Alternatively, the script may be stored at a service provider and may be sent to the mobile device when loss or theft of the mobile device is detected or reported. The script may, for example, include instructions to encrypt private data on the mobile device, to send the private data to a data storehouse, and/or to otherwise disable one or more of the personal organizer functions of the mobile device.

13 Claims, 6 Drawing Sheets

METHOD AND SYSTEM FOR SECURING A MOBILE DEVICE

BACKGROUND

The functions of portable electronic organizers and mobile communications devices, such as mobile telephones, are increasingly being incorporated into a single mobile device. As such mobile devices incorporate more functions, they become proportionately more valuable not only to their owners, but also to prospective thieves. A thief could attempt to steal such a mobile device to make use of the mobile telephone function, or of the electronic organizer function, or both. Where the mobile device stores sensitive data entered by an authorized user, the potential for that data to be read by a thief is particularly troubling. The sensitive data could be even more valuable than the device itself.

When a mobile telephone is stolen, the owner of the telephone can contact a service provider to report the theft and to cancel telephone service. For mobile devices that provide little more than telephone service, that cancellation may render the device useless to the thief. Canceling telephone service, however, could be insufficient to deter the theft of a more robust mobile device, such as a device that offers personal organizer functions in combination with telephone service. Even if the telephone service were canceled, the thief could make use of the personal organizer function and read any data stored on the mobile device. Accordingly, thieves of mobile devices may not be fully discouraged by the cancellation of telephone service.

SUMMARY

An exemplary mobile device includes script interpretation logic. When the loss or theft of the mobile device is detected, the script interpretation logic executes a script to disable one or more functions or the mobile device, such as personal organizer functions in the mobile device. The script may be stored locally on the mobile device even before loss or theft of the mobile device is detected. Alternatively, the script may be stored at a service provider and may be sent to the mobile device when loss or theft of the mobile device is detected or reported. The script may, for example, include instructions to encrypt the private data, to send the private data to a data storehouse, and/or to otherwise disable one or more of the personal organizer functions of the mobile device.

DETAILED DESCRIPTION OF EXEMPLARY EMBODIMENTS

1. The Mobile Device

Figure 1:
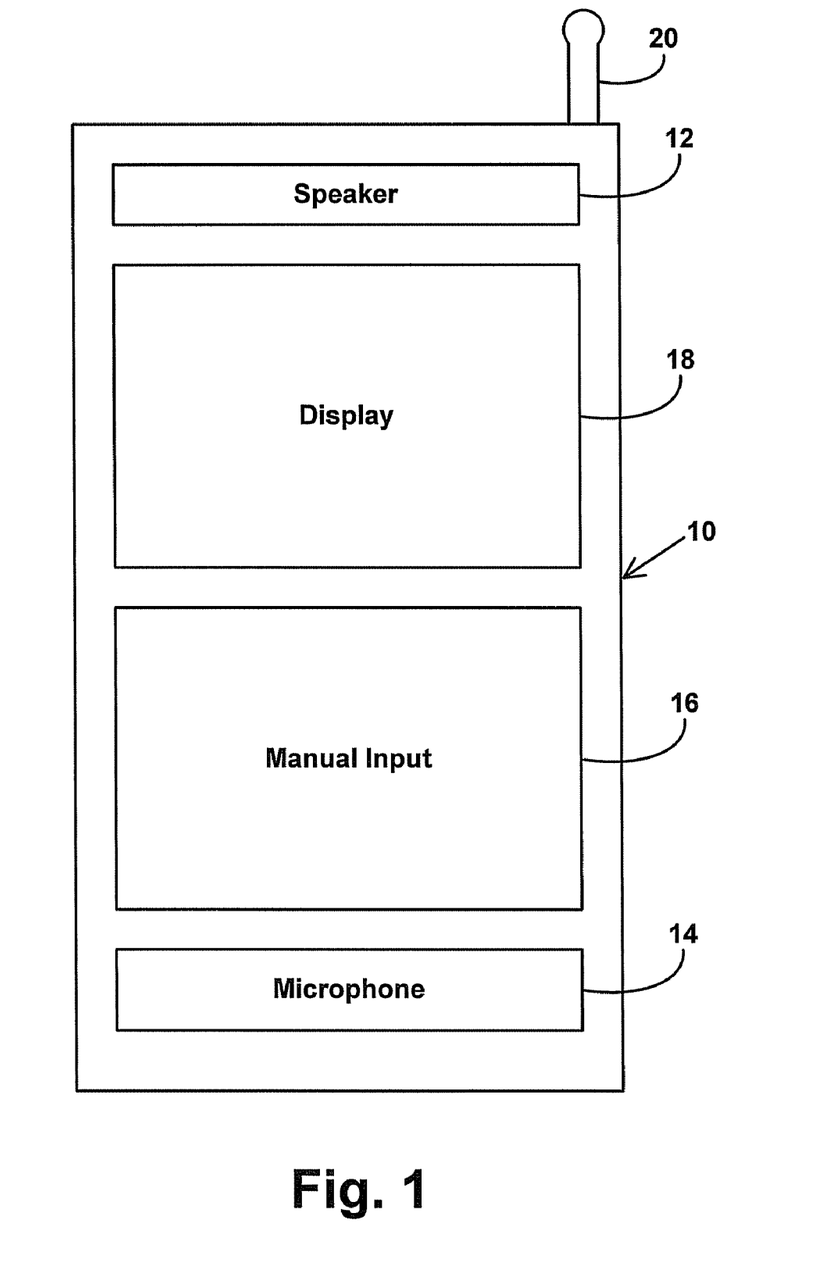
FIG. 1 is a schematic illustration of a mobile device.
Figure 2:
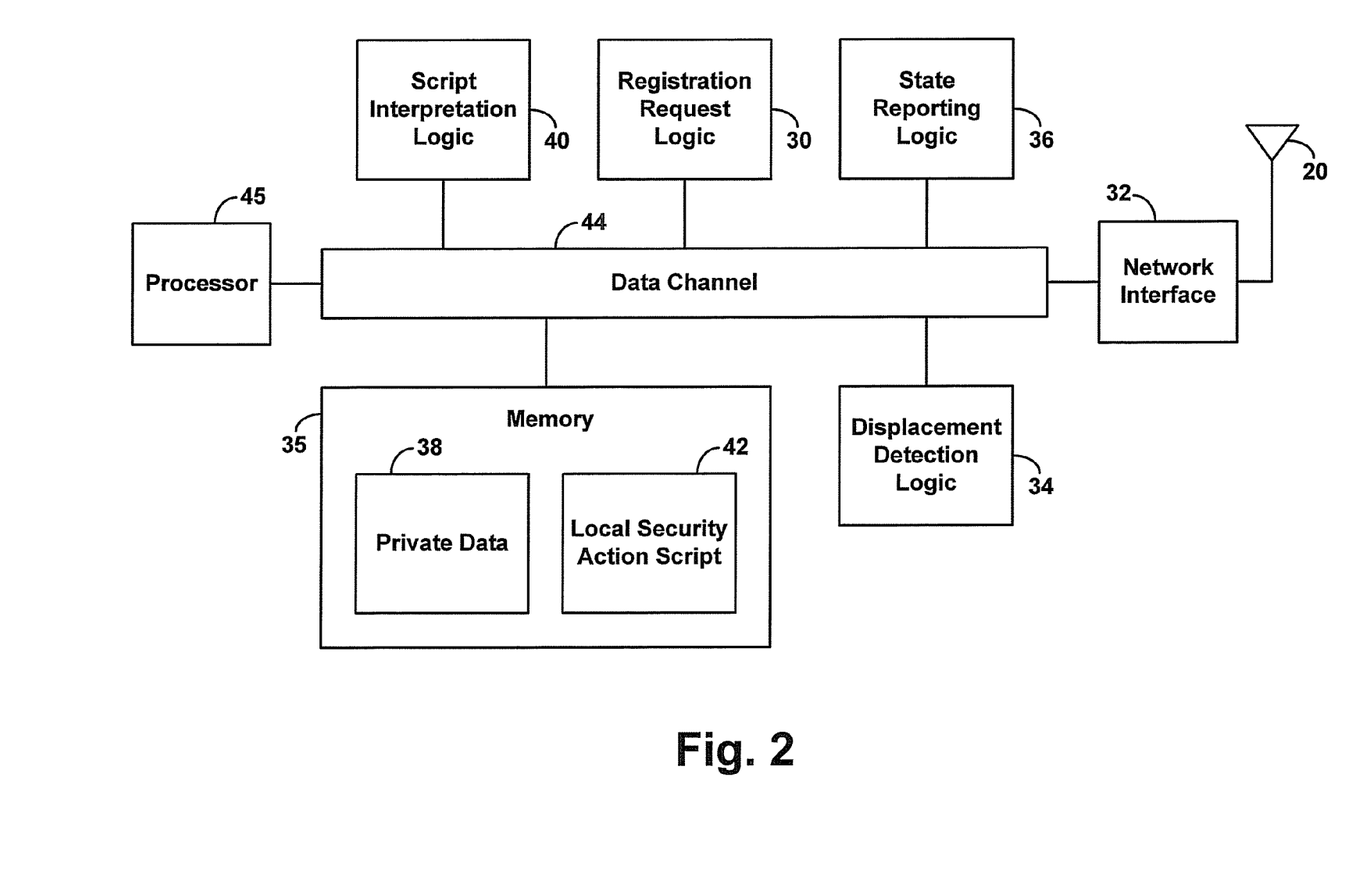
FIG. 2 is a block diagram illustrating the architecture of a mobile device.

A system for securing a mobile device may be implemented in a mobile device, such as the device 10 illustrated in FIGS. 1 and 2. The exemplary mobile device 10 includes both a mobile telephone function and a personal organizer function.

The mobile device 10 includes a speaker 12 and a microphone 14, which are used in verbal telephone communications. A manual input 16, such as a keypad, is used for entering telephone numbers or other data, and a display 18, such as a liquid crystal display (LCD), displays information to the user. The display 18 may be a touch sensitive display to facilitate the input of data into the mobile device. An antenna 20 is used in wireless communications, such as radio-frequency communications with a base station when the mobile device 10 is used to make mobile telephone calls.

As illustrated in FIG. 2, the mobile device 10 is further provided with a network interface 32 that manages communications between the mobile device 10 and a wireless network. Registration request logic 30 is provided for registering the mobile device with a mobile communications service provider. The mobile device includes at least one personal organizer function, such as a calendar, a to-do list, a contacts directory, and/or a note pad. The personal organizer function accesses a memory 35 that stores private data 38. The private data 38 may include telephone numbers, addresses or other contact information, a personal calendar, passwords, customer lists, formulas, data files, or other information. A user may enter information into the mobile device through the manual input 16, and the device may display information on the display 18.

2. Execution of Disabling Scripts

To secure the mobile device 10 in case of loss or theft, the mobile device is capable of executing a script to disable one or more features of the device. The disabling script is executed after a displacement condition is detected. A displacement condition is a condition in which indicia of loss or theft of the mobile device have been identified. A displacement condition may be detected by the mobile device itself (as described in further detail in Section 3, below), or a displacement condition may be detected by a service provider (as described in Section 6, below). Although a displacement condition is preferably detected only when the mobile device has actually been lost or stolen, displacement may occasionally be detected even when the mobile device has not actually been lost or stolen, for example where buttons are accidentally pressed on a mobile device (such as when the device is casually stuffed in a pocket), resulting in the inadvertent entry of an incorrect password.

The origin of the disabling script may vary in different embodiments of the system. In one embodiment, the disabling script is sent to the mobile device after displacement is detected. In another embodiment, the disabling script is stored in the memory of the mobile device before displacement is detected. In either event, after displacement is detected, the mobile device executes the disabling script to perform the functions directed in the script. Examples of functions that may be performed by a disabling script are the following:

a. Disabling the telephone function or other communications functions (such as short messaging service) of the mobile device 10.

b. Disabling the personal organizer function of the mobile device 10, so that a person who steals or recovers the mobile device cannot make use of the mobile device as a personal organizer. For example, in one embodiment, a personal organizer function is operated by personal organizer software stored in the mobile device. A flag also stored in the mobile device determines whether the personal organizer function is disabled. When a user attempts to access the personal organizer function, the software checks the flag, and if the flag is set, the software does not offer the personal organizer function. Thus, to disable the personal organizer function, the script can set the flag to indicate that the personal organizer function is disabled. In an alternative method of disabling a personal organizer function, the disabling script may delete all or part of the personal organizer software or of data needed by the personal organizer software to operate.

c. Changing an electronic identifier of the mobile device 10.
d. Disabling the manual input 16.
e. Deleting the private data 38, such as addresses, telephone numbers, appointments, a to-do list, or notes. A user may mark in advance what data is considered private, or all data may be considered private.
f. Writing random data over the private data 38.
g. Encrypting the private data 38.
h. Sending the private data 38 to a service provider. The disabling script may encrypt the private data before sending it to the service provider. The mobile device may send the private data as an SIP message, an SMS message, an HTTP message, or in other data formats. The mobile device may encrypt the data (for example, using a public key associated with the data storehouse, or with a public key of the authorized user) before sending the data to the storehouse. The mobile device may delete the private data after sending it to the storehouse.
i. Disabling the use of the mobile device 10 as a key for transactions. The ability of the mobile device to be used in authentication and/or authorization of transactions (for example, through a challenge-response protocol) may be disabled.
j. Issuing an audible alarm over the speaker 12 or other speaker. Instructions in the disabling script may direct the mobile device to monitor its location through, for example, GPS or land-based locator signals and to issue an alarm only when the mobile device is in a specified location, such as near a police station or other security point.
k. Sending communications such as SMS messages, instant messages, or other data or homing signal permitting the location of the mobile device. The signal may be sent to the service provider, security authorities, or an authorized user of the mobile device. The signal may identify the location of the mobile device, which the device may determine with the use of a GPS receiver (if it is so equipped) or with the use of a land-based locator signal, such as a signal received from cellular telephone system antennas.
l. Alerting an authorized user of the mobile device of the loss or theft of the mobile device. The alert may be sent by, for example, dialing a land-line telephone number of the authorized user, security authorities, or the service provider, and sending a digital or audio message reporting the loss or theft.
m. Instructing the mobile device to run a subroutine stored in the memory 35 of the mobile device. The subroutine may perform one or more other disabling functions. In one embodiment, a disabling script that includes such an instruction is sent wirelessly to the mobile device. In that embodiment, the subroutine called by the disabling script may be a local disabling script 42 stored in the memory 35 of the mobile device 10. The local disabling script itself performs disabling functions, such as one or more of the functions discussed herein.
n. Executing other operations to permanently or temporarily disable all or part of the mobile device 10.
o. Executing other operations to delete, encrypt, or otherwise render inaccessible the private data 38.

The format of the disabling script may vary in different embodiments, or even within a single embodiment. For example, depending on the embodiment, the disabling script may include instructions written in a high-level computer language, in bytecode, in assembly code, in machine language instructions, or in a combination of these formats. The system is provided with script interpretation logic 40 to manage the execution of the disabling script. The script interpretation logic manages the script according to the format of the script. For example, in an embodiment in which the script includes machine language instructions, the script interpretation logic 40 may execute the script by passing the instructions to a processor in the mobile device. In an embodiment in which the script includes instructions in a high-level language, the script interpretation logic includes an interpreter to execute the instructions. The interpreter itself may be implemented by machine language instructions.

FIGS. 4a-4d are flow diagrams of the operation of four embodiments of the system. As discussed above, in different embodiments, displacement may be detected by the mobile device or remotely from the mobile device, and the disabling script may be sent wirelessly to the mobile device or it may be a local disabling script stored in the mobile device before displacement is detected. These different variations are illustrated in FIGS. 4a-4d.

Figure 4A:
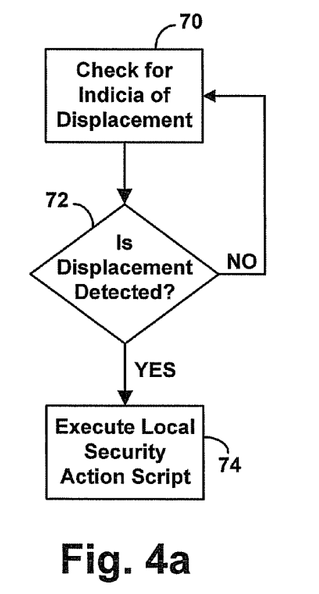
FIGS. 4a-4d are flow diagrams illustrating the operation of a system for securing a mobile device.

In the embodiment of FIG. 4a, the displacement is detected locally (i.e., the mobile device detects its own displacement), and the disabling script is a local disabling script. At step 70, the mobile device checks for indicia of displacement, and at step 72, the mobile device determines whether displacement has been detected. The process of detecting displacement by a mobile device is described in further detail in Section 3, below. If the mobile device has detected a displacement condition, then the device executes a local disabling script at step 74.

Figure 4B:
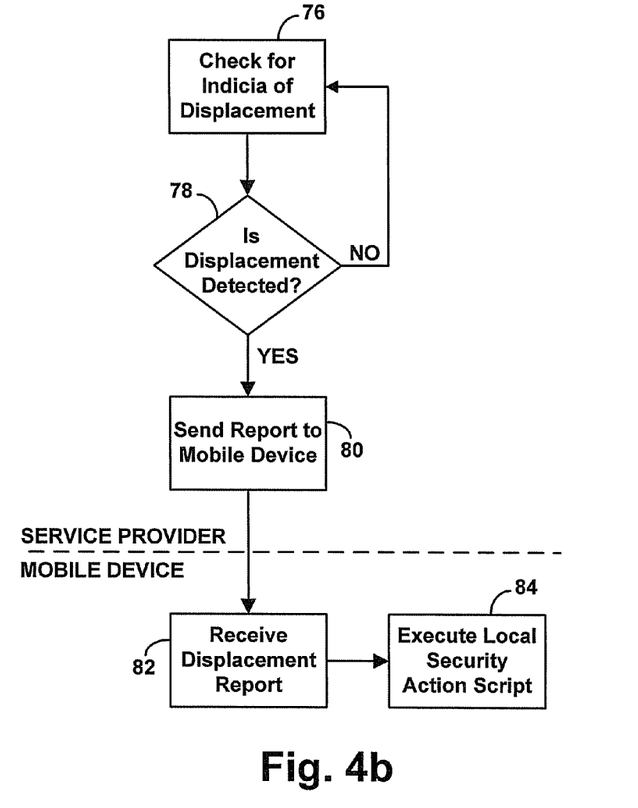

In the embodiment of FIG. 4b, the displacement is detected remotely (i.e., at a location remote from the mobile device, such as at a mobile communications service provider), and the disabling script is a local disabling script stored by the mobile device. At step 76, the service provider checks for indicia of displacement, and at step 78, the service provider determines whether displacement has been detected. The process of detecting displacement by a service provider is described in further detail in Section 6, below. If displacement has been detected, the service provider sends a displacement report to the mobile device at step 80. The mobile device receives the displacement report at step 82 and executes a local disabling script at step 84.

Figure 4C:
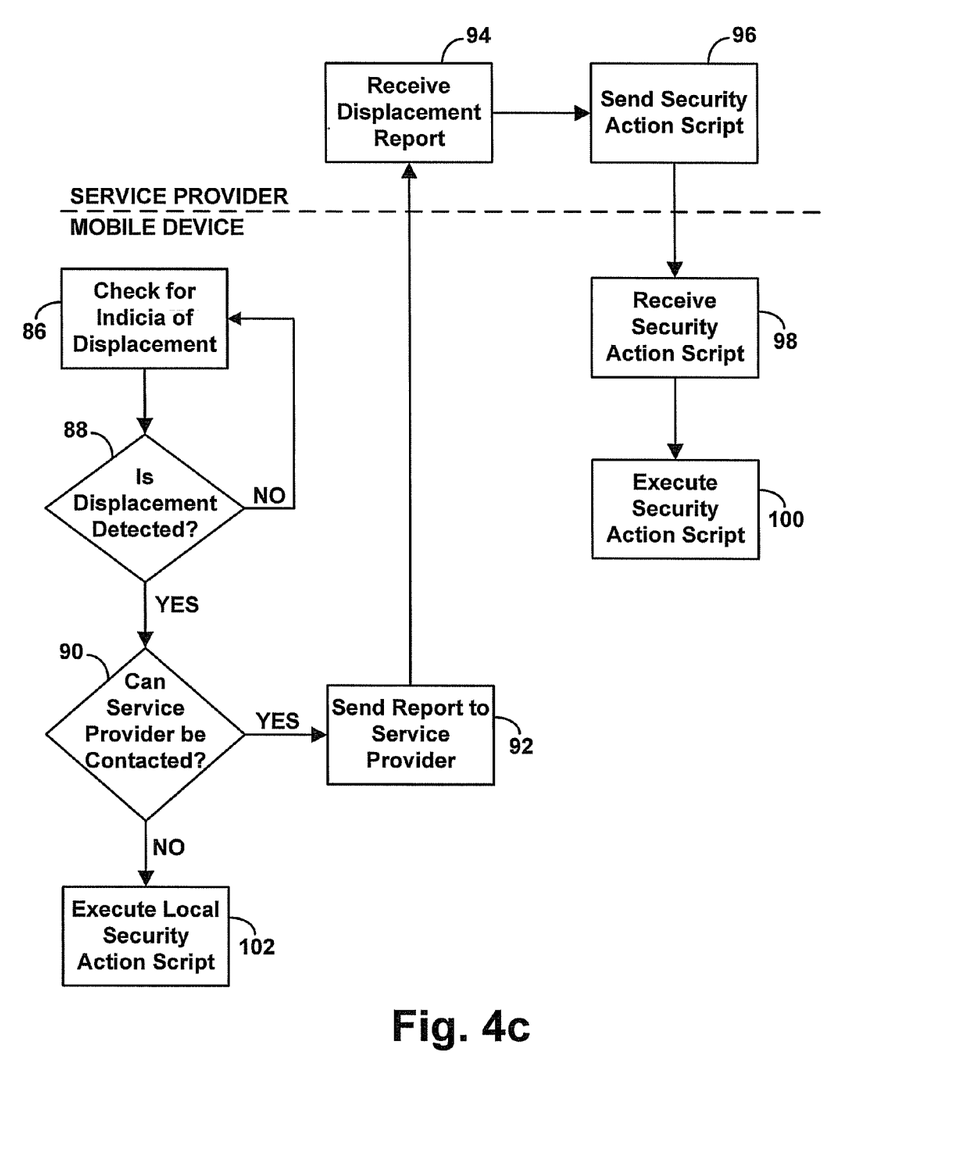

In the embodiment of FIG. 4c, the displacement is detected locally, but the disabling script is sent from a remote location, such as a service provider. At step 86, the mobile device checks for indicia of displacement, and at step 88, the mobile device determines whether displacement has been detected. At step 90, the mobile device attempts to establish communications with the service provider. If it succeeds, the mobile device reports its displacement to the service provider at step 92. The service provider receives the report of the mobile device's displacement at step 94 and sends a disabling script to the mobile device at step 96. The mobile device receives the disabling script at step 98 and executes the script at step 100.

In an embodiment such as the embodiment of FIG. 4c, the use of a remote disabling script may be preferred to a local disabling script. A remote disabling script may, for example, permit an authorized user of the mobile device to select the functions performed by the disabling script even after the device has been lost or stolen, whereas the user may not have the ability to change a local disabling script once the device is lost or stolen. Even where the use of a remote disabling script is preferred, however, a displaced mobile device may be unable to communicate with a service provider to receive a remote disabling script. For example, the device may be out of range, or a thief may intentionally block its signal. The embodiment of FIG. 4c anticipates such difficulties by providing for the execution of a local disabling script in case communication with the service provider is interrupted. If, at step 90, the mobile device was unable to establish communications with the service provider, the mobile device executes a local disabling script at step 102.

Figure 4D:
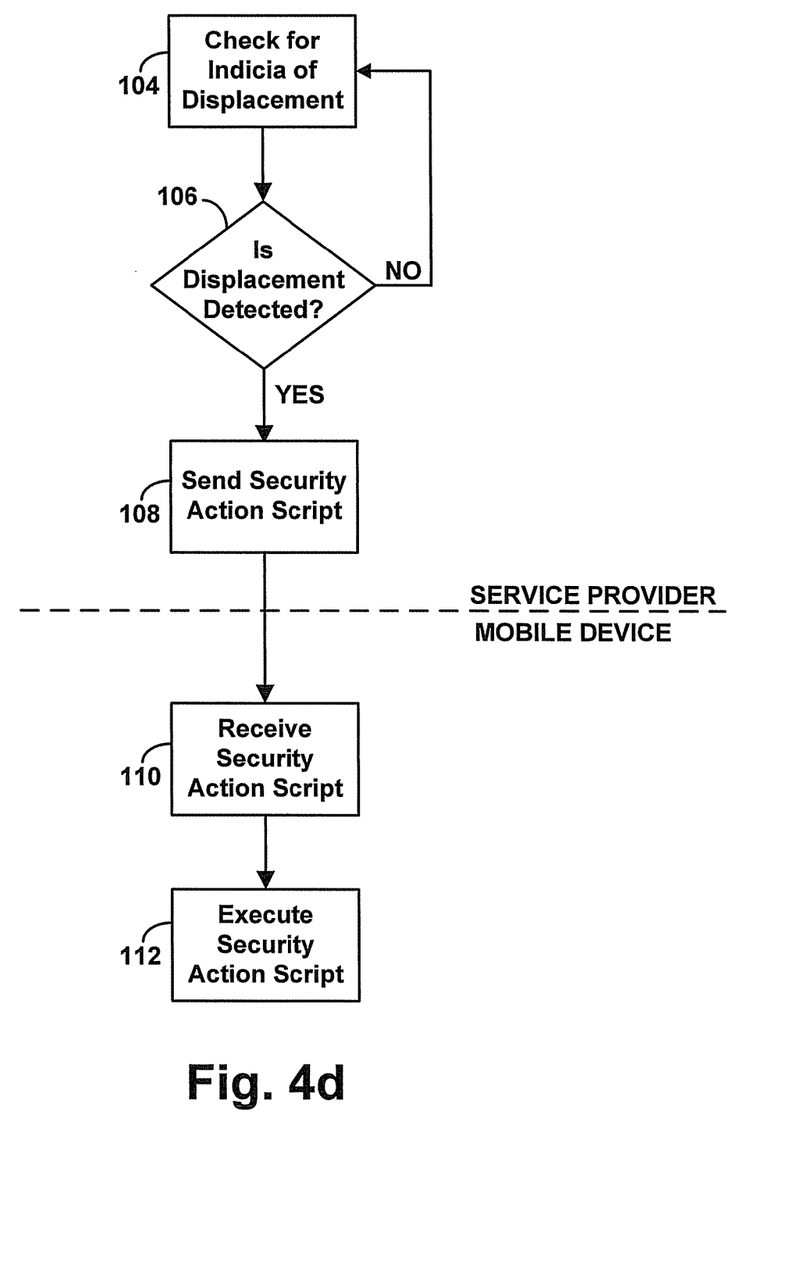

In the embodiment of FIG. 4d, the displacement condition is detected at a remote location, such as a service provider, and the disabling script is sent from that service provider. At step 104, the service provider checks for indicia of displacement, and at step 106, the service provider determines whether displacement has been detected. If displacement has been detected, the service provider sends a disabling script to the mobile device at step 108. At step 110, the mobile device receives the disabling script, and at step 112 the mobile device executes the disabling script.

Although the embodiments of FIGS. 4a-4d are shown for the sake of illustration as different embodiments, other embodiments may be implemented by combining their features. For example, in an embodiment that combines the features of the embodiments of FIGS. 4a and 4d, a mobile device executes a local disabling script if the device detects its own displacement (as in FIG. 4a), and it executes a disabling script sent from a service provider if the service provider remotely detects the displacement of the mobile device (as in FIG. 4d).

3. Detection of Displacement by the Mobile Device

In an embodiment in which the mobile device detects its own displacement, the mobile device checks for indicia of displacement, i.e., quantifiable indications that the mobile device has been lost or stolen. In such an embodiment, the device has displacement detection logic 34 to detect whether the mobile device 10 has been displaced.

One indication that the mobile device has been lost or stolen is the receipt of a wireless message sent to the device reporting of the loss or theft. Such a message may be sent, for example, by a service provider or by an authorized user of the mobile device. The message may be sent in various formats, such as an SMS message or an audio telephone call. In one embodiment, the authorized user of a lost or stolen mobile device may dial a telephone number of the device, and if someone answers the call, the authorized user may send a passcode, such as a DTMF (i.e., touchtone) code to the mobile device. The displacement detection logic 34 monitors incoming calls for the passcode, and it detects a displacement condition if the passcode is sent.

The displacement detection logic 34 may be sensitive to a variety of other indicia that provide evidence of loss or theft. For example, in some embodiments, the mobile device 10 requires a user to enter a password—through the manual input 16, for example—to access the private data 38 and/or to use the telephone function of the device. In those embodiments, the displacement detection logic 10 may count the number of incorrect passwords entered. If more than a threshold number of incorrect passwords are entered, the detection logic 34 detects that the mobile device 10 has been displaced. The threshold may be set at, for example, ten incorrect passwords.

In another embodiment in which the device detects its own displacement, the detection logic 34 monitors the location of the device to determine whether the device has been removed from a permitted area. In the event that the mobile device maintains wireless communication with a set of base stations, such as mobile telephone base stations, the device may monitor its location by identifying one or more base stations with which the mobile device is in proximity. In another embodiment, a mobile device monitors its location using a Global Positioning System (GPS) receiver. The displacement detection logic 34 stores a predefined geographic range in the memory 35. The range may be defined as a radius from a particular location, such as the user's home or place of business. If the mobile device is located outside the range, the detection logic 34 detects a displacement condition of the mobile device 10.

In another embodiment, the mobile device detects whether it has been lost or stolen with the use of a challenge-response protocol. In that case, the mobile device poses a challenge by, for example, displaying a request for a password on the display 18 and alerting a user to the presence of the challenge with an audible alert. The mobile device may present the challenge at regularly scheduled times, such as once a day, to ensure that an authorized user is still in possession of the device. In this example, if the user responds incorrectly to the challenge by entering one or more incorrect passwords, or if the user does not respond at all to the challenge within a preset amount of time, then the displacement detection logic 34 detects a displacement condition.

In another example, the mobile device may detect that it has been lost or stolen if it has not been used for an excess period of time. The displacement detection logic 34 measures time elapsed since the mobile device 10 was last used and compares the elapsed time to a threshold time. If the mobile device has been in disuse for longer than the threshold time, the displacement detection logic detects that the mobile device is in a displacement condition.

The mobile device may employ a combination of these indicia to detect a displacement condition. In one embodiment, the displacement detection logic 34 combines a challenge response protocol with a geographic test. In this embodiment, the mobile device monitors its location—with a GPS receiver, for example. If the mobile device leaves a predefined geographic range, the displacement detection logic 34 initiates a challenge, such as a request for a password. If the device is still in the possession of an authorized user, the authorized user may enter the correct password, and no displacement condition will be detected despite the removal of the mobile device from the predetermined geographic range.

4. Displacement Message Sent by the Mobile Device

In one embodiment, if the mobile device detects that it has been lost or stolen, the device sends a wireless report of its displacement. In such an embodiment, the mobile device is provided with state reporting logic 36. If a displacement condition is detected, the state reporting logic 36 sends a displacement message to a mobile communications service provider or to another entity, such as the police, a security agency, or an authorized user of the mobile device. The displacement message may be, for example, a short message service (SMS) message, an instant message (IM), an electronic mail message, an automated telephone call, or a message in another communication format. The memory 35 of the mobile phone may store one or more records including the addresses of entities to be contacted in case a displacement condition is detected, together with the information that will be sent to those entities.

In the embodiment of FIG. 4c, the state reporting logic 36 of the mobile device reports the existence of a displacement condition to the service provider through the network interface 32 of the mobile device.

When the mobile device reports its displacement, it may do so clandestinely, so that a person in possession of the device is not notified of the report. For example, the display 18 of the mobile device may remain blank, or display only a default screen, while the device sends a notification of its displacement. Alternatively, the mobile device 10 may provide on the display 18 a notification that the device is reporting its displacement, thereby discouraging continued use of the device by thieves. Where the mobile device is equipped with a GPS receiver or other means of determining its location, the device may report its location along with the displacement condition.

5. Receiving Displacement Messages at the Mobile Device

In several implementations of the system for securing a mobile device, the mobile device receives information from a remote entity, such as a service provider, after a displacement condition is detected. The received information may include a report that the remote entity has detected a displacement condition, or the received information may include a disabling script to be executed by the mobile device. Messages sent to the mobile device that report displacement or that convey a disabling script are referred to herein as displacement messages. For example, in the embodiment of FIG. 4b, a service provider sends a displacement message that reports the displacement to the mobile device. In the embodiments of FIGS. 4c and 4d, the service provider sends a displacement message that includes a disabling script to the mobile device.

In one embodiment, a mobile communications service provider sends a displacement message to the mobile device in response to the registration of the mobile device with the service provider. Registration is an exchange of messages between the mobile device and the service provider in which the mobile device informs the service provider that it is active and located in a service area served by the service provider.

The registration of mobile devices with mobile communications nodes is known in the art of wireless communications. Registration takes place, for example, when a mobile device is first brought into a service area served by the service provider, when the mobile device is activated in the service area, or when the mobile device initiates an outgoing communication (such as a telephone call) from the service area.

In an embodiment in which the service provider includes several mobile communications nodes, such as base stations and base station controllers, each of which services a different region in the service area, the mobile device may register with the service provider when it moves from one region to another. In that case, the mobile device may either register when it first enters the new region, or it may register only at a later time, such as when an incoming communication (such as an incoming telephone call) is directed to the mobile device. In this latter case, the service provider may attempt to locate the mobile device in different regions (for example, by searching in an increasing radius from the mobile device's last known position), and when the mobile device is located in a service area, it registers with the service provider using the mobile communications node serving that region.

The registration may be conducted using A11 registration protocols as described in the TLA/EIA interim standard "Interoperability Specification (IOS) for CDMA2000 Access Network Interfaces," TIA/EIA/IS-2001.7-B (May 2002). As another example, the registration may be conducted using the registration protocol described in Request for Comment (RFC) RFC-3220, "IP Mobility Support for IPv4."

In response to the registration of the mobile device with a mobile communications node, if the mobile device is in a displacement condition, the service provider sends a displacement message to the mobile device. Were permitted by the registration protocol, the displacement message may be sent as a part of the registration protocol, such as in a registration reply message. Alternatively, the displacement message may be sent as another type of message, such as a Session Initiation Protocol (SIP) message, an SMS message, or an HTTP message. The displacement message is preferably sent within a short window of time, such as one minute, after the start of the registration to increase the likelihood that the mobile device is still in contact with the mobile communications node when the displacement message is sent.

The network interface 32 of the mobile device includes a message client for decoding the displacement message. For example, where the displacement message is sent as an SIP, SMS, and/or HTTP message, the network interface 32 includes, respectively, an SIP, SMS, and/or HTTP client application to read the incoming displacement message.

6. An Exemplary Mobile Communications Service Provider

Figure 3:
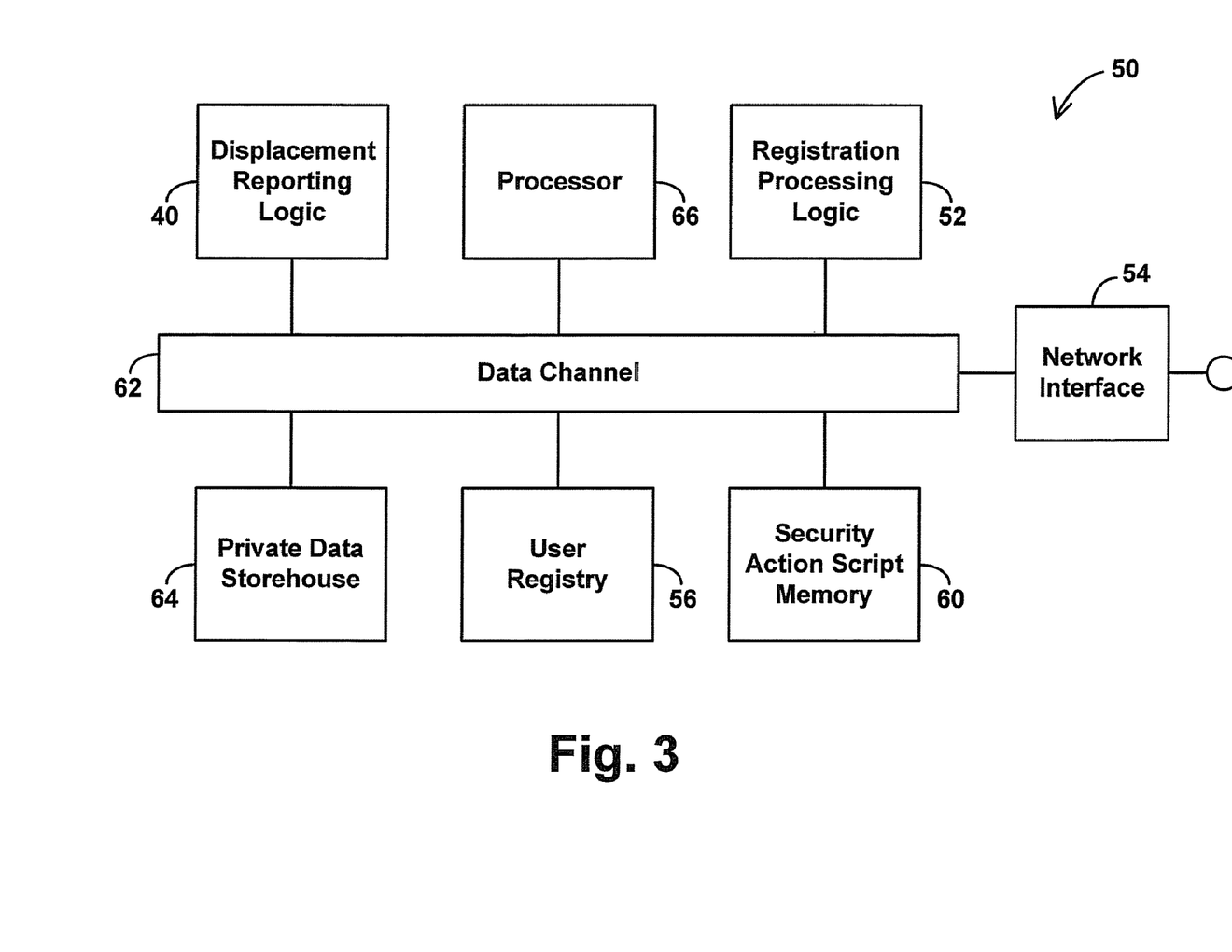
FIG. 3 is a block diagram illustrating the architecture of a service provider.

The architecture of a mobile communications service provider 50 is illustrated in FIG. 3. The service provider 50 includes a network interface 54 for communicating with mobile devices such as the mobile device 10 described above. The service provider may be a mobile telephone service provider. The network interface 54 may include a network of mobile communications nodes such as base station controllers and base stations, which the service provider uses to communicate with mobile devices. Registration processing logic 52 manages registration requests from mobile devices such as the mobile device 10. A user registry 56 keeps records of users registered with the service provider. The user registry 56 may be, for example, a home location register (HLR) or a visitor location register (VLR), or it may be a separate database.

The service provider 50 includes displacement detection logic 57 that monitors for displacement of one or more mobile devices. Like the displacement detection logic 34 implemented in the mobile device 10, the displacement detection logic 57 checks for indicia of displacement to determine whether a displacement condition has been detected. For example, displacement detection logic 57 may detect whether an excess amount of time has passed since the mobile device 10 was in communication with the service provider, or whether the mobile device 10 has failed to respond to a request for acknowledgement.

In one embodiment, the service provider detects a displacement condition of the mobile device when the service provider receives a report that the device has been lost or stolen. In such an embodiment, the displacement detection logic 57 includes displacement reporting logic 58. The displacement reporting logic receives reports of lost or stolen mobile devices and records data in the user registry 56 that indicates which mobile devices have been lost or stolen.

In different embodiments, the displacement reporting logic 58 may receive reports of loss or theft through various media. The displacement reporting logic 58 may include an interface to a telephone system wherein a user of a mobile device can dial in and report a mobile device as lost or stolen, through a touch-tone menu system, for example. The displacement reporting logic 58 may include an interface to a computer system in which lost or stolen mobile phones are reported over a computer network. In one such system, users of mobile devices may report displaced mobile devices themselves over the Internet. In another such system, users may report displaced mobile devices to a voice operator, who enters information about the unit into a computer system.

The user registry 56 stores records of displaced mobile devices. The user registry 56 may, for example include a database in which identifiers of mobile devices are associated with displacement data. Such a database may be indexed by international mobile subscriber identifier (IMSI), network access identifier (NAI), IP address, or other device identifier. The displacement data may be a flag that is set to indicate when the mobile device is displaced. Alternatively, the displacement data may be more detailed, indicating, for example, whether the mobile device is lost, out of range, stolen, in disuse, whether the user has not responded to a challenge-response protocol, and/or whether an excess number of incorrect passwords have been entered in the device.

When a mobile device registers with the service provider 50, registration processing logic 52 checks the user registry 58 to determine whether the mobile device is displaced. If the mobile device is displaced, the service provider sends a displacement message to the mobile device. The format of the displacement message can vary for different embodiments of the system. For example, in the embodiment of FIG. 4b, the displacement message may simply report the displacement to the mobile device. In the embodiments of FIGS. 4c and 4d, the displacement message includes a disabling script to the mobile device. If a displacement message is to be sent to the mobile device, the service provider selects a disabling script to send to the mobile device and sends the script over the network interface 54 to the mobile device 10.

The service provider can store disabling scripts in a disabling script memory 60. The disabling script memory may include a database that stores different disabling scripts for different mobile devices and indexes the scripts by a device identifier. Alternatively, the disabling script memory may include data that identifies, for different mobile devices, the functions to be performed by a disabling script. A script that performs the identified functions is then located in the script memory 60 and sent over the network interface 54 to the mobile device. Alternatively, a script is created automatically to perform the identified functions.

A user of a mobile device may be given the option of which functions will be performed in a disabling script sent to the user's mobile device. The user may be given the option to select functions in advance. Alternatively, once a user's device becomes displaced, the user may then be able to select which disabling script functions should be performed. Functions to be performed by a disabling script include the disabling functions described in Section 2, above. For example, a user may be provided with access to a Web site where the user is provided with options as to which functions should be performed if the user's mobile device should be lost or stolen. As an alternative to user-selected functions, a service provider may determine what functions will be performed by a disabling script. The service provider's selection may be based on, for example, services offered at different subscription levels.

The functions to be performed by the disabling script may be chosen based on the expected uses of the mobile device. In one instance, a user who intends to store very sensitive data on the device may select to have all private data deleted from the device and/or to have the private data overwritten with random data to remove any residual trace of the data from memory. On the other hand, a user who intends to store more mundane data may chose functions that merely secure the mobile device with a password. In the latter case, a person who finds the mobile device or who has stolen the mobile device may be unable to access any features of the device, but if the device is recovered by an authorized user, who enters the proper password, operation of the mobile device is restored.

The service provider 50 may include a private data storehouse 64. In that case, where a disabling script instructs a mobile device 10 to send private data to the service provider, the private data storehouse 64 stores the data for retrieval by an authorized user of the mobile device. The private data storehouse 64 may be implemented as a database.

7. An Exemplary Disabling Script

A disabling script sent to the mobile device from a service provider may take the form of a series of instructions such as the exemplary disabling script of Example 1. Example 1 is written in "pseudocode," i.e., it illustrates a series of steps that may be taken but is not limiting as to the semantics or syntax of the script. The disabling script need not be limited to any particular format, and may take the form of high-level instructions understandable to a human reader, low-level machine-language instructions, or another level of instructions.

EXAMPLE 1

```
001:    <script>
002:    if ( ThisUser.challenge_response( ) == INVALID ) {
003:        if(ThisPhone.LOCALSCRIPT == TRUE) {
004:            LocalDisablingScript( );
005:        }
006:        PhoneBook.delete( );
007:        NotepadBackup = Notepad.encrypt(KEY);
008:        Send (NotepadBackup, STOREHOUSE_ID);
009:    }
010:    </script>
```

In the script of Example 1, tags at lines 001 and 010 demarcate the script and may be used to allow the mobile device 10 to identify a script in other incoming data, such as an SMS message, instant message, or other packet data. At line 002, the script instructs the mobile device 10 to initiate a challenge-response protocol to provide a final check of whether the mobile device 10 is in the possession of an authorized user. If the outcome of the challenge-response protocol is invalid (e.g., there is no response, or an incorrect response is entered), line 003 of the script tests whether the phone has a local disabling script stored in its memory. In this example, the presence of a local disabling script is indicated by a flag "LOCALSCRIPT" in the data structure "ThisPhone" being set to the value "TRUE." If there is a local script, the disabling script calls the local script at line 004.

At line 006 the disabling script instructs the mobile device 10 to delete phone book data stored in the mobile device. At line 007, the script instructs the mobile device 10 to encrypt data stored in a notepad memory with an encryption key "KEY" and to store the encrypted data as an encrypted data structure NotepadBackup. The encryption key may be stored in the mobile device or it may be sent to the mobile device with the disabling script or at another time. The key may be, for example, the public key of an asymmetric key pair. At line 008, the script instructs the mobile device 10 to send the encrypted notepad data to a data storehouse such as the private data storehouse 64 of the service provider. A parameter "STOREHOUSE_ID" is used to identify where the encrypted notepad data is sent. STOREHOUSE_ID may be, for example, an index value indicating a data record in a database. A disabling script need not include multiple instructions; a disabling script may be a single instruction that directs the mobile device to execute a local disabling script.

Instructions sent in a disabling script may be function calls or subroutine calls that direct the mobile device to execute one or more instructions that make up a function or subroutine. In that case, the instructions that make up the function or subroutine may be stored in the mobile device in advance, or they may be sent to the mobile device with the disabling script or at another time.

8. Additional Embodiments

The system described herein can be embodied with variations from the examples described above, and the details of those embodiments can be implemented with a variety of techniques. For example, the components of the mobile device 10 may communicate over a data channel 44, such as a data bus. The script interpretation logic 40, registration request logic 30, state reporting logic 36, and/or displacement detection logic 34 may be implemented in software as machine language instructions stored in a data storage such as the memory 35 and executable by a processor 45 in the mobile device 10. Alternatively, these elements may be implemented as hardwired electronic circuits such as digital logic circuits.

The components of the service provider 50 may communicate over a data channel 62, such as a data bus or a data network. The displacement reporting logic 58 and registration processing logic 52 may be implemented as instructions executable by a processor 66 and stored in data storage, such as a CD-ROM, DVD-ROM, hard drive, random-access memory, or other storage medium.

The service provider 50 may be associated with several mobile communications nodes. In that case, features of the service provider, such as the displacement recording logic 58, the private data storehouse 64, and the user registry 56 may be shared by and/or distributed among multiple mobile communications nodes.

The embodiments described above should be understood to illustrate rather than limit the scope of the present invention. Features of the various embodiments can be interchanged and combined while keeping within the scope of the invention, as defined by the following claims.

The invention claimed is:

1. A method of securing a mobile device, comprising:
   detecting displacement of a mobile device;
   storing, in a database entry associated with the mobile device, data identifying the mobile device as displaced;
   receiving a registration message from the mobile device;
   in response to receiving the registration message, checking the database to determine whether the mobile device is identified as displaced; and
   after determining that the mobile device has been displaced, sending a disabling script to the mobile device, wherein the disabling script includes an instruction to send personal data from the mobile device to a data storehouse and an instruction to issue an audible alert when the mobile device is in a specified location.

2. The method of claim 1, wherein the step of detecting displacement includes receiving a displacement signal from the mobile device indicating that the mobile device is lost or stolen.

3. The method of claim 1, wherein the step of detecting displacement includes receiving a telephone report that the mobile device is lost or stolen.

4. The method of claim 1, wherein the step of detecting displacement includes receiving a report over the Internet that the mobile device is lost or stolen.

5. The method of claim 1, wherein the disabling script includes an instruction to delete personal information stored in the mobile device.

6. A system for securing a mobile device, comprising:
   detection logic in the mobile device operative to detecting a displacement condition indicating that the mobile device is lost or stolen;
   state reporting logic in the mobile device operative to send to a service provider a displacement message indicating that the mobile device is lost or stolen;
   registration request logic in the mobile device for sending a registration message to the service provider;
   a network interface in the mobile device for receiving a disabling script; and
   script interpretation logic in the mobile device for executing the disabling script;
   wherein the script interpretation logic is responsive to an instruction in the disabling script to send personal data from the mobile device to a data storehouse and to an instruction to issue an audible alert when the mobile device is in a specified location.

7. The system of claim 6, wherein the detection logic is operative to detect when a number of incorrect passwords exceeds a threshold number.

8. The system of claim 6, wherein the detection logic is operative to detect when the mobile device leaves a predefined geographic range.

9. The system of claim 6, wherein the detection logic is operative to detect a message sent from a service provider indicating that the mobile device has been displaced.

10. In a service provider operative to provide wireless communications with a mobile device, a security system comprising:
    displacement reporting logic operative to receive a report that a mobile device is displaced;
    registration processing logic for receiving a registration message from the mobile device;
    a network interface for sending a disabling script to the mobile device in response to receiving the registration message from the mobile device, wherein the disabling script includes an instruction to issue an audible alert when the mobile device is in a specified location; and
    a data storehouse, wherein the disabling script includes an instruction to send personal data from the mobile device to the data storehouse.

11. The system of claim 10, wherein the disabling script includes an instruction to encrypt personal data on the mobile device.

12. The system of claim 10, wherein the disabling script includes an instruction to delete personal data from the mobile device.

13. A mobile device security system implemented at a service provider, comprising:
- a network interface;
- a processor; and
- data storage;
- wherein the data storage stores instructions executable by the processor (i) to receive a notification that a mobile device is displaced; (ii) to receive a registration message from the mobile device; and (iii) to send a disabling script to the mobile device in response to the registration message from the mobile device, wherein the disabling script includes an instruction to send personal data from the mobile device to a data storehouse, and wherein the disabling script includes an instruction to issue an audible alert when the mobile device is in a specified location.

\* \* \* \* \*